United States Patent [19]
Duxbury

[11] Patent Number: 5,347,578
[45] Date of Patent: Sep. 13, 1994

[54] COMPUTER SYSTEM SECURITY

[75] Inventor: Paul Duxbury, Sandbach, England

[73] Assignee: International Computers Limited, London, England

[21] Appl. No.: 22,058

[22] Filed: Feb. 24, 1993

[30] Foreign Application Priority Data

Mar. 17, 1992 [GB] United Kingdom ............... 9205774.4

[51] Int. Cl.⁵ ............................................. H04L 9/00
[52] U.S. Cl. ........................................... 380/4; 380/3; 380/55
[58] Field of Search ................................. 380/3, 4, 55

[56] References Cited
U.S. PATENT DOCUMENTS 5,077,795 12/1991 Rourke ................................. 380/55

FOREIGN PATENT DOCUMENTS 0456386 11/1991 European Pat. Off. .

Primary Examiner—David C. Cain
Attorney, Agent, or Firm—Lee, Mann, Smith, McWilliams, Sweeney & Ohlson

[57] ABSTRACT

A computer system is described in which users can access a protected resource only by way of a call to a user monitor command, specifying the protected resource as a parameter. The user monitor command checks that certain conditions are satisfied and performs specified actions before permitting access to the protected resource. The checks may include checking whether options and argument values supplied by the user satisfy specified conditions. The actions may include dynamically modifying a supplementary groups list of a current process temporarily granting or removing privileges to or from the user.

9 Claims, 2 Drawing Sheets

COMPUTER SYSTEM SECURITY

BACKGROUND OF THE INVENTION

This invention relates to computer system security. More specifically, the invention is concerned with a mechanism for protecting a computer system from its users.

There are many ways an authorised computer user can misuse a computer system, either accidentally or maliciously. Consequences can include temporary damage to local service availability, direct or indirect financial loss, or even criminal or civil liability on the part of the employer.

Some specific threats include:

import of unauthorised software, such as games, with the inherent risk of virus attack, copyright infringement, or just time wasting;

misuse of a privilege such as 37 superuser", which is needed to do a routine operational job, for illicit purposes like accessing private data;

disuse of password protection because of the need to know several passwords and to have some passwords shared;

loss of individual accountability because of the need for shared usernames and passwords;

destruction of a database, or bypass of its security, by use of the wrong programs;

The object of the present invention is to provide a mechanism which helps to protect against these threats.

SUMMARY OF THE INVENTION

According to the invention there is provided a computer system accessible to a plurality of users and having a plurality of protected resources, wherein users can access a protected resource only by way of a call to a user monitor command, specifying the protected resource as a parameter, and wherein the user monitor command checks that predetermined conditions are satisfied before permitting access to the protected resource.

DESCRIPTION OF AN EMBODIMENT OF THE INVENTION

One computer system in accordance with the invention will now be described by way of example with reference to the accompanying drawings.

Figure 1:
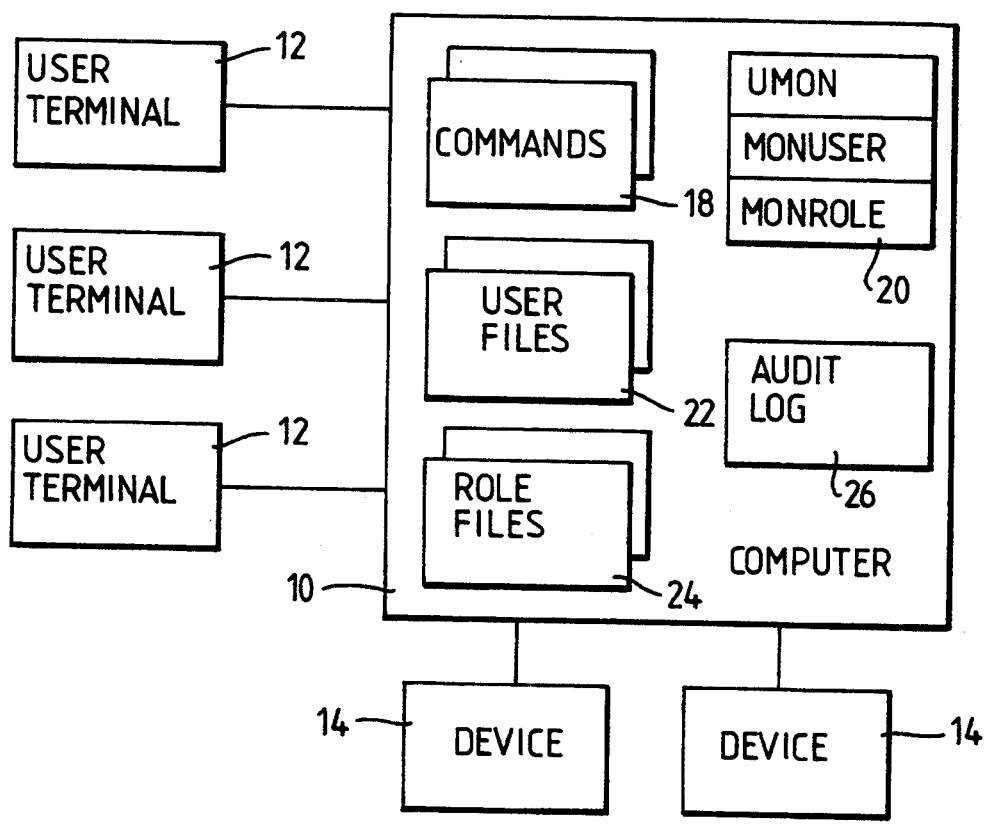
FIG. 1 is a schematic block diagram of a computer system embodying the invention.

Referring to FIG. 1, the system comprises a central computer 10 which in this example is a conventional computer running under the UNIX operating system. (UNIX is a trademark of Unix Laboratories Inc).

A number of (human) users can access the central computer by way of user terminals 12. When a user wishes to access the system, the user must first log in to the system in the conventional manner. Each user has a unique user identity allocated by the system.

The system also includes a number of devices 14, such as printers or data storage units, attached to the central computer.

The computer has a system memory which holds both programs and data, including a number of conventional UNIX commands 18.

The system also includes three special commands 20 as follows:

umon—user security monitor
monuser—administer umon user database
monrole—administer umon role database As will be described, umon makes use of a private umon database, consisting of a set of user files 22, and a set of role files 24. The monuser command is used to create, update or delete the user files, while the monrole command creates, updates or deletes the role files.

The system also includes an audit log 26 which is used to record incidents in the system such as potential security violations.

The umon command enables fine control over which users can execute which commands, and with what privilege. It can also control access to other resources, and can selectively log accesses.

To use umon, the command or other resource to be protected is excluded from general access by users, via the normal UNIX mechanisms (e.g., restrict access to owner and/or group only). The command cannot then be executed directly by a normal user. Instead, the user must call umon, passing the target command and arguments as arguments to umon.

Alternatively, as well as being restricted, the target command may be moved and replaced by a symbolic link to umon. Thus any attempt to invoke the command will automatically invoke umon (which then determines the intended command from argv[0]). This invisible mode of operation allows umon to be used within suitable existing programs such as menu shells.

Umon is a privileged command controlled by the private umon database 22, 24. This database defines relevant users and the restricted command they are allowed to access. On entry, umon looks up the calling (real) user in its database to see if access is to be granted and, if so, how the temporary access is to be achieved. For example, this might be done by changing the current user and/or group, or by adding a group to the caller's list of supplementary groups.

Such access is granted for the duration of the target command only. As well a giving access to commands, temporary access to other restricted resources such as files and devices can be granted. Privileges may also be granted, e.g., by allowing selected commands issued by selected users to run as superuser.

In addition to restriction based on the caller's (real) login name, many other checks can be included in the database. For example: time of day; day of week; current terminal; arguments supplied by caller; and so on. Also, in addition to actions needed to grant temporary access, other actions may be defined in order to set up the environment for the command.

For ease of administration, command definitions in the database can be grouped together into named roles, representing particular user or administrative job functions. Granted permission for a user to access a role gives access to all the commands in the role, subject to other checks included with the commands. When calling umon, the role may be stated explicitly. Otherwise, the user and any roles permitted to him/her are searched in turn. A reserved role name "global" is used for commands available to everyone, and is searched last.

Umon may optionally be used without parameters, as a shell. In this case, a default command is associated with the user in the umon database.

Umon may optionally be called in a test mode. In this mode, the command will not be executed, but all checks will be performed to test whether access is available to the current user. This is useful for menu systems which require to display only those commands which are available to the current user at the current time. The umon database may also contain items which do not correspond to commands, and are included only for use with the test function, for controlling menus. For example, these may include intermediate menu names and communications path names.

Each user file 22 in the umon database relates to a particular user, and contains the following records:
—default command. This indicates the command which is to be executed in the case where umon is called without any arguments (i.e., as a shell).
role list. This is a list of roles permitted for the user.
log command list. This is a list of commands whose execution is to be recorded in the audit log if accessed by the user.
command description. Each user file may contain a number of command descriptions, one for each target command that the user is permitted to access via umon. Each command description specifies the conditions for permitting access to the command, and also specifies how this access is to be achieved.

Each command description record has the following structure: Cmdname[#tag][[?!|!]condition[[?|! ]...][:path][:action[:... ]]

Cmdname is the name of the target command as it will be invoked through umon. It may be the name of the target command file, or some other suitable key. #tag is an optional string of characters used to distinguish this record from others for the same cmdname and user (i.e., if the same command name is included more than once with different conditions). The tag is only needed for removing command records. ? Condition and !Condition are optional extra checks which must be performed before allowing the user access. Several conditions may be included, each beginning with either ? if the expression is to evaluate to TRUE, of ! if the condition is to evaluate to FALSE, for access to be granted. All conditions must succeed for access to be granted (i.e., there is a logical AND between entries). For example, the following conditions may be specified:
check that the current terminal name is one of a specified list of values.
check that the current real user identity matches one of a specified list of values, using a specified relational operator (e.g., equals, greater than, less than, not equals).
check that the current time of day or day of the week matches one of a specified list of values.
check that any options or argument values supplied by the user match one of a specified list of values.
:Path is the full path name for the target command.

If the path name is omitted, the record may only be used with the −t (test) option of umon (e.g., to record a menu name or a service name). If no path field is included, the command description may be accessed via the test mode of umon. Additional conditions are allowed and are evaluated during test, but no additional actions may be included. Thus, menu names and service names can be restricted in the same way as commands, though this must be enforced by the menu system itself (umon here performing an advisory function).

:Action is an optional action to perform before executing the target command. Several actions may be included, and are executed in sequence. Usually, actions will be used to gain access to the target command, or to acquire other privilege such as superuser. For example, the following actions may be specified:
set the real and effective user or group of the current process to a specified value, e.g., superuser.
replace the user-specified argument list with a specified argument list.
change the current directory or root to a specified path.
dynamically add a specified list of groups to the current processes supplementary groups list, to give temporary access to new resources, such as a device or the target command itself, without removing any existing access permissions.
remove one or more groups from the current process's supplementary groups list. This can be used to remove access/privilege, for example when entering a shell, to prevent the user breaking out to perform other commands with this same privilege.
set the user ID back to that of the original user at session login, e.g., to remove superuser status. Again, this allows privilege to be reset when entering command shells.
establish a read or write lock on a specified file path.
execute a specified command or shell script.

Each role file 24 in the umon database relates to a particular role which has been defined in the system, and contains the following records:
log command list.
one or more command descriptions.

These are similar to the corresponding records in the user files.

The form of a call to the umon command is:
umon [−t][role. ] cmd [arg...]
where square brackets indicate optional parameters.

The presence of the −t parameter indicates that the command is to run in test mode. The role parameter allows a user to specify a role name explicitly. This is useful in the case where a user has access to the same command by way of more than one role but with different permissions and/or actions. Normally, the first occurring role would be used, which might not reflect all the privileges that the user requires. The other parameters specify the target command, and the arguments of the target command.

Figure 2:
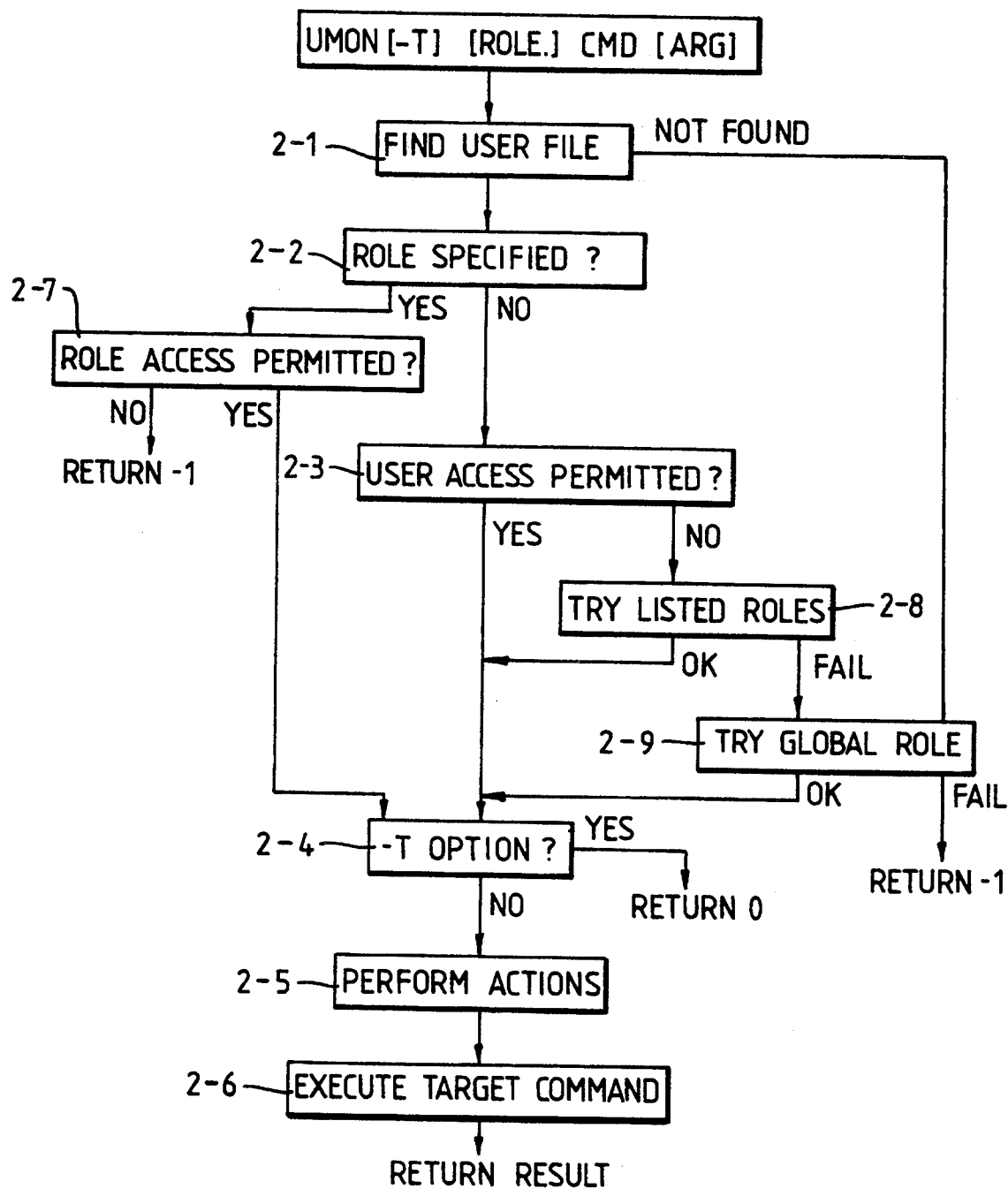
FIG. 2 is a flow chart showing the operation of a user security monitor command (referred hereinafter as "umon").

The operation of the umon command will now be described in more detail with reference to FIG. 2.

(2-1) When call is made to umon, umon first consults the umon database to find the user file (if any) for the current user.

(2—2) A check is then made to determine whether a role was explicitly specified.

(2—3) If no role was specified, umon searches the user file to find a command description record that relates to the specified target command. Umon then checks whether the conditions specified in this record are satisfied. If so, then access to the target command by the user is permitted. If, on the other hand, no command description record for the target command is found, or the conditions are not satisfied, access is denied.

(2—4) If access is permitted, umon then checks whether the −t option is specified in the call. If the −t option was specified, umon simply returns a "0" value, without performing any further actions.

(2-5) If the −t option was not specified, umon then performs any actions specified in the actions field of the command description, to set up the environment for execution of the target command.

(2-6) The target command is then executed. The target command execution is direct (using "exec") rather than via shell (using "system") to avoid the possibility of "Trojan horse" commands being supplied as arguments to the original command.

Umon then returns the result of the execution of the target instruction to the user.

(2-7) If a role was explicitly specified, umon checks that this role is on the user's role list. If so, umon accesses the role file for this role, and determines whether this role is permitted to access the target command. If access is permitted, umon continues at step (2-4) as described above. If the role is not on the user's role list, or the role is not permitted to access the target command, umon returns a value −1 to indicate failure.

(2-8) If user access was not permitted at step (2-3), umon then consults the role list in the user file, to determine which roles are permitted for this user. Umon then consults the role file for each of these permitted roles in turn, and checks whether that role is permitted to access the target command. If a role is found for which access is permitted, umon continues at step (2-4) as described above.

(2-9) If no user file was found at step (2-1), or no suitable role file was found at step (2-8), umon then accesses the global role file and checks whether the global role is permitted to access the target command. If so, then umon continues at step (2-4) as described above. If the global role is not permitted to access the target command, umon returns a value −1 to indicate failure.

In summary, it can be seen that umon helps protect against threats by dynamically controlling the commands, command arguments, privileges, devices and files available to any user. Thus, a user can be restricted to a defined set of commands, and any privileges needed to execute a command can be allocated dynamically for the duration of the command only.

For example, a user who needs to perform filestore backup can be granted access to the prescribed backup program from his own login. He can be granted superuser privilege and access to the exchangeable media device only for the duration of that program. He can be denied access to other privileged commands, such as restore. This avoids him using superuser privilege to access confidential information, or using the exchangeable media device to import illicit software, or needing to know more than one password.

Umon is role-based for convenience, supports command-line and menu-based access, can be used invisibly from within existing programs, and allows selected actions to be logged and traced back to a specific end-user by means of the audit log.

I claim:

1. A computer system comprising
   (a) a computer providing a plurality of protected resources,
   (b) a plurality of user access means attached to the computer for allowing each user to send commands to the computer, said commands including a user monitor command containing an argument specifying one of said protected resources, and
   (c) command execution means in said computer, for executing said user monitor command by checking that predetermined conditions are satisfied and then, provided that said predetermined conditions are satisfied, for acessing said one of said protected resources on behalf of said user, and then returning a result to the user.

2. A system according to claim 1 wherein the checks performed by the user monitor command include checking whether options and argument values supplied by the user satisfy specified conditions.

3. A system according to claim 1 including means responsive to said monitor command for performing predetermined actions before access is permitted in order to ensure that access is made in a controlled manner.

4. A system according to claim 3 wherein said actions include dynamically modifying a current process's supplementary groups list.

5. A system according to claim 3 wherein said actions include granting or removing privileges to or from the user while said user monitor command is being executed.

6. A system according to claim 1, including a database accessible by said monitoring means, for indicating which users are permitted to indirectly access which resources.

7. A system according to claim 6 wherein said database also indicates the conditions that are to be satisfied and actions that are to be performed before permitting access.

8. A system according to claim 6 wherein said database also indicates which of a predetermined set of roles are available to each user, and indicates which roles are permitted to access which resources.

9. A system according to claim 1 wherein said protected resources comprise means for executing commands.

* * * * *